(12) United States Patent
Sako et al.

(10) Patent No.: US 7,496,004 B2
(45) Date of Patent: Feb. 24, 2009

(54) DATA REPRODUCING APPARATUS, DATA REPRODUCING METHOD, DATA RECORDING AND REPRODUCING APPARATUS, AND DATA RECORDING AND REPRODUCING METHOD

(75) Inventors: Yoichiro Sako, Tokyo (JP); Toshiro Terauchi, Tokyo (JP); Makoto Inoue, Kanagawa (JP); Katsuya Shirai, Kanagawa (JP); Yasushi Miyajima, Kanagawa (JP); Motoyuki Takai, Tokyo (JP); Kenichi Makino, Kanagawa (JP); Akiko Inoue, Saitama (JP)

(73) Assignee: Sony Corporation, Tokyo (JP)

( * ) Notice: Subject to any disclaimer, the term of this patent is extended or adjusted under 35 U.S.C. 154(b) by 636 days.

(21) Appl. No.: 10/831,253

(22) Filed: Apr. 26, 2004

(65) Prior Publication Data

US 2005/0031302 A1    Feb. 10, 2005

(30) Foreign Application Priority Data

May 2, 2003    (JP) .............................. 2003-127301

(51) Int. Cl.
*G11B 7/005* (2006.01)

(52) U.S. Cl. .................................. 369/4; 386/68; 386/82

(58) Field of Classification Search ........................ None
See application file for complete search history.

(56) References Cited

U.S. PATENT DOCUMENTS

| | | | | |
|---|---|---|---|---|
| 4,052,720 A * | 10/1977 | McGregor et al. | ........... | 340/522 |
| 4,549,289 A * | 10/1985 | Schwartz et al. | ........... | 369/53.1 |
| 4,558,460 A * | 12/1985 | Tanaka et al. | .................. | 381/86 |
| 5,081,896 A * | 1/1992 | Hiyoshi et al. | ................. | 84/600 |
| 5,287,478 A | 2/1994 | Johnston et al. | | |
| 5,293,358 A * | 3/1994 | Krause | ........................... | 369/2 |
| 5,350,880 A * | 9/1994 | Sato | ............................ | 84/609 |
| 5,526,331 A * | 6/1996 | Park et al. | ................. | 369/47.12 |
| 5,576,685 A * | 11/1996 | Saito | ........................ | 340/384.1 |
| 5,963,524 A * | 10/1999 | Tokiwa et al. | ............. | 369/53.23 |
| 6,388,965 B2 * | 5/2002 | Ozawa et al. | ............. | 369/47.12 |
| 6,542,613 B1 * | 4/2003 | Rieber | ......................... | 381/124 |
| 6,683,241 B2 * | 1/2004 | Wieder | ........................ | 84/609 |
| 6,751,167 B2 * | 6/2004 | Yamada et al. | ........... | 369/30.19 |
| 6,973,016 B2 * | 12/2005 | Fukushima et al. | ......... | 369/47.5 |
| 7,078,607 B2 * | 7/2006 | Alferness | ...................... | 84/609 |

(Continued)

FOREIGN PATENT DOCUMENTS

EP    1 107 255    6/2001

(Continued)

OTHER PUBLICATIONS

Patent Abstracts of Japan, JP 2000-348466, Dec. 15, 2000.

(Continued)

*Primary Examiner*—Michael V Battaglia
(74) *Attorney, Agent, or Firm*—Oblon, Spivak, McClelland, Maier & Neustadt, P.C.

(57) ABSTRACT

A data reproducing apparatus is disclosed. The data reproducing apparatus comprising reproducing means for reading data from a recording medium, and data varying means for varying the data that is read from the recording medium whenever the data is read therefrom or once every a plurality of times it is read therefrom.

16 Claims, 12 Drawing Sheets

U.S. PATENT DOCUMENTS 7,155,017 B2 * 12/2006 Kim et al. .................... 381/59

FOREIGN PATENT DOCUMENTS

| | | |
|---|---|---|
| EP | 1 176 594 | 1/2002 |
| EP | 1 247 070 | 1/2003 |
| JP | 57-13497 | 1/1982 |
| JP | 5-82488 | 11/1993 |
| JP | 11-341443 | 12/1999 |
| JP | 2000-81880 | 3/2000 |
| JP | 2001-231013 | 8/2001 |
| JP | 2002-91443 | 3/2002 |
| WO | WO 98/15112 | 4/1998 |

OTHER PUBLICATIONS

Patent Abstracts of Japan, JP 08-128219, May 21, 1996.

* cited by examiner

DATA REPRODUCING APPARATUS, DATA REPRODUCING METHOD, DATA RECORDING AND REPRODUCING APPARATUS, AND DATA RECORDING AND REPRODUCING METHOD

BACKGROUND OF THE INVENTION

1. Field of the Invention

The present invention relates to a data reproducing apparatus for reproducing data from a recording medium, a data reproducing method, a data recording and reproducing apparatus, and a data recording and reproducing method.

2. Description of the Related Art

In recent years, mediums on which digital data is recorded have been substituted for those on which analog data is recorded. This is because a medium on which digital data such as music data, image data, and picture data are recorded allows them to be reproduced without deterioration of their qualities.

A reproducing apparatus that reproduces data from a medium allows the user to set the luminance, color tone, and sound range of data recorded thereon for user's desired levels. In addition, recently, as a method for varying settings of picture quality, sound quality, and so forth, a reproducing apparatus that allows its settings to be varied in accordance with living body information of the user has been proposed (refer to for example the following patent related art reference 1).

Patent related art reference:

Japanese Patent Laid-Open Publication No. HEI 10-211177

However, contents are reproduced from mediums such as a compact disc (CD), a digital versatile disc (DVD), and a digital video (DV) disc without deterioration of their qualities. Thus, if the user listens to or watches the same contents reproduced from a medium a number of times, he or she will become weary thereof.

OBJECTS AND SUMMARY OF THE INVENTION

Therefore, an object of the present invention is to provide a data reproducing apparatus, a data reproducing method, a data recording and reproducing apparatus, and a data recording and reproducing method that allow the user to enjoy listening to and watching contents reproduced from the medium a number of times, without becoming weary thereof.

A first aspect of the present invention is a data reproducing apparatus, comprising: reproducing means for reading data from a recording medium; and data varying means for varying the data that is read from the recording medium whenever the data is read therefrom or once every a plurality of times it is read therefrom.

A second aspect of the present invention is a data reproducing method, comprising the steps of: reading data from a recording medium; and varying the data that is read from the recording medium whenever the data is read therefrom or once every a plurality of times it is read therefrom.

A third aspect of the present invention is a data recording and reproducing apparatus, comprising: recording and reproducing means for writing data to a recording medium and reading data from the recording medium; conversion information generating means for generating conversion information that varies whenever the data is read from the recording medium or once every a plurality of times it is read therefrom; and data converting means for converting the data that is read from the recording medium by the recording and reproducing means in accordance with the conversion information supplied from the conversion information generating means or conversion information that is read from the recording medium, wherein when registration of a reproduction characteristic is designated, the recording and reproducing means is configured to record the conversion information to the recording medium.

A fourth aspect of the present invention is a data recording and reproducing method, comprising the steps of: generating conversion information that varies whenever data is read from a recording medium or once every a plurality of times it is read therefrom; converting the data that is read from the recording medium in accordance with the conversion information generated at the conversion information generating step; recording the conversion information to the recording medium when registration of a reproduction characteristic is designated; and converting the data that is read from the recording medium in accordance with the conversion information that is read from the recording medium when the reproduction in accordance with the registered reproduction characteristic is designated.

According to the present invention, data that is read from a recording medium is varied in a different manner whenever it is read therefrom or once every a plurality of times it is read therefrom. Thus, different data can be output whenever or once every a plurality of times data is read from a recording medium. Consequently, even if data is repeatedly reproduced from the same recording medium a plurality of times, the user can enjoy them without becoming weary thereof.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Next, with reference to the accompanying drawings, embodiments of the present invention will be described.

First Embodiment

Figure 1:
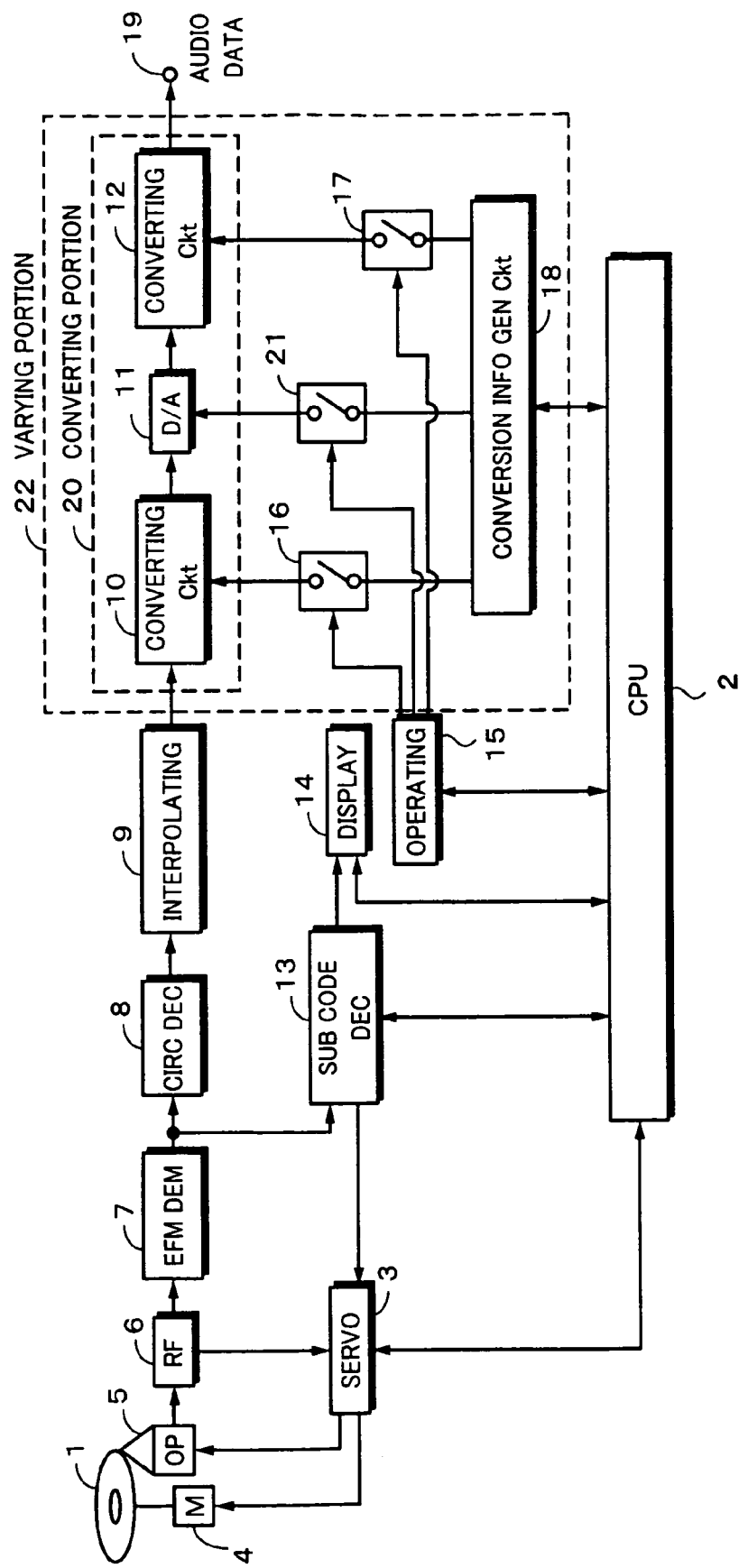
FIG. 1 is a block diagram showing an example of a structure of a data reproducing apparatus according to a first embodiment of the present invention.

FIG. 1 shows an example of a structure of a data reproducing apparatus according to a first embodiment of the present invention. As shown in FIG. 1, the data reproducing apparatus comprises a central processing unit (CPU) (as controlling means) 2, a servo portion 3, a spindle motor 4, an optical pickup (as reproducing means) 5, an RF amplifier 6, an eight-to-fourteen modulation (EFM) demodulating circuit 7, a cross interleaved Reed-Solomon code (CIRC) decoder 8, an error interpolating circuit 9, a sub code decoder 13, a display device 14, an operation device 15, a data varying portion (as data varying means) 22, and an output terminal 19. In FIG. 1, reference numeral 1 represents an optical disc (as a recording medium) such as a CD. The output terminal 19 is connected to for example an amplifier.

As shown in FIG. 1, the data varying portion 22 comprises a data converting portion (as data converting means) 20, a switch 16, a switch 21, a switch 17, and a conversion information generating circuit (as conversion information generating means) 18. On the other hand, the data converting portion 20 comprises a first data converting circuit (as first data converting means) 10, a digital-analog converting portion (hereinafter referred to as D/A converting portion) (as D/A converting means) 11, and a second data converting circuit (as second data converting means) 12.

The optical disc 1 is placed on a turn table and rotated by the spindle motor 4. The spindle motor 4 is driven and rotated at a constant linear velocity (CLV) under the control of the servo portion 3. The servo portion 3 generates various servo drive signals for focus, tracking, thread, and spindle servo drives in accordance with a focus signal, a tracking signal, and an operation command that is supplied from the CPU 2 and outputs these signals to the spindle motor 4 and the optical pickup 5. The CPU 2 controls all the data reproducing apparatus. The CPU 2 is connected to the display device 14, the operation device 15, the sub code decoder 13, and the servo portion 3. The optical pickup 5 focuses an optical beam of a semiconductor laser on a signal side of the optical disc 1 and traces tracks formed in a concentric circle shape or a spiral shape thereon. The optical pickup 5 is moved by a thread mechanism. Digital audio data that is output from the optical pickup 5 is supplied to the EFM demodulating circuit 7 through the RF amplifier 6.

The EFM demodulating circuit 7 demodulates the digital audio data that is supplied from the optical pickup 5 through the RF amplifier 6 in accordance with EFM and supplies the demodulated data to the CIRC decoder 8. The CIRC decoder 8 corrects errors of the digital audio data supplied from the EFM demodulating circuit 7 in accordance with CIRC and supplies the corrected data to the error interpolating circuit 9. The error interpolating circuit 9 interpolates the digital audio data that is supplied from the CIRC decoder 8 and supplies the interpolated digital audio data to the data varying portion 22.

The data varying portion 22 varies the digital audio data supplied from the error interpolating circuit 9 whenever data is read from the optical disc 1 or once every a plurality of times it is read therefrom and supplies the varied digital audio data to the output terminal 19. The digital audio data is varied for example in at least one of manners that a predetermined frequency band is emphasized or suppressed, the number of quantizer bits is varied, a sampling frequency is varied, the bit rate is varied, the tempo is varied, a high frequency band is added, a noise is added, and an echo is added.

The sub code decoder 13 decodes a sub code supplied from the EFM demodulating circuit 7 under the control of the CPU 2 and supplies the decoded sub code to the display device 14 and the servo portion 3. The display device 14 is composed of for example a liquid crystal display or a fluorescent lamp (FL). The display device 14 displays information in accordance with data supplied from the sub code decoder 13 under the control of the CPU 2. The operation device 15 has buttons or the like. The operation device 15 controls each portion of the data reproducing apparatus with buttons or the like.

Next, the operation of each portion of the data varying portion 22 will be described. The conversion information generating circuit 18 generates conversion information that varies whenever digital audio data is read from the optical disc 1 or once every a plurality of times it is read therefrom under the control of the CPU 2 and supplies the generated conversion information to the data converting portion 20 through the switches 16, 21, and 17.

The conversion information generating circuit 18 is for example a random number generator (as random number generating means), a timer (as time information generating means), a pressure sensor (as pressure generating means), environmental information generator (as environmental information generating means), or a global positioning system (GPS) receiver (as positioning information generating means). The random number generator generates a random number. The timer generates time information. The pressure sensor has keys and/or buttons and generates pressure information in accordance with pressures of the keys and/or buttons. The pressure sensor generates pressure information in accordance with pressures of the keys and/or buttons. The environmental information generator generates environmental information in accordance with an environmental state. The GPS receiver generates positioning information in accordance with the position of the data reproducing apparatus. In this example, the timer is capable of generating at least one of information of year, month, day, day of week, and time. The environmental information generator is a sensor that is capable of measuring at least one of temperature, humidity, atmospheric pressure, brightness, wind rate, and wind direction.

The data converting portion 20 converts data supplied from the error interpolating circuit 9 in accordance with conversion information supplied from the conversion information generating circuit 18 through the switches 16, 21, and 17 and supplies the converted data to the output terminal 19.

Next, the operation of each portion of the data converting portion 20 will be described. The first data converting circuit 10 converts digital audio data supplied from the error interpolating circuit 9 in accordance with conversion information supplied from the conversion information generating circuit 18 through the switch 16 and supplies the converted data to the D/A converting portion 11. In other words, the first data converting circuit 10 varies the digital audio data supplied from the error interpolating circuit 9 whenever the digital audio data is read from the optical disc 1 or once every a plurality of times it is read therefrom and supplies the varied digital audio data to the D/A converting portion 11. The first data converting circuit 10 varies the digital audio data for example in at least one of manners that a predetermined frequency band is emphasized or suppressed, the tempo is varied, a high frequency band is added, a noise is added, and an echo is added.

Figure 2:
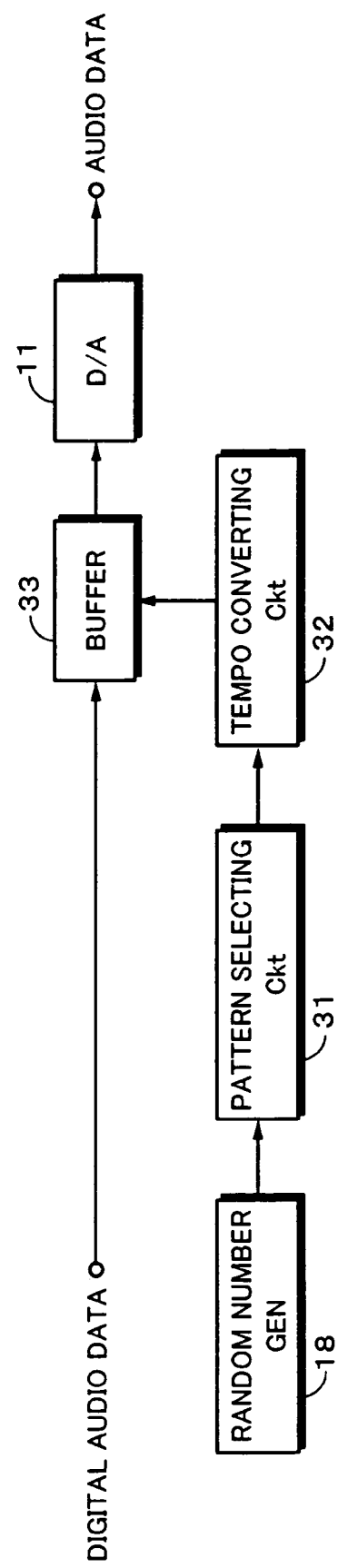
FIG. 2 is a block diagram showing an example of a structure of a first data converting circuit according to the first embodiment of the present invention.

FIG. 2 shows an example of a structure of the first data converting circuit 10 that varies the tempo of music that is reproduced. As shown in FIG. 2, the first data converting circuit 10 comprises a pattern selecting circuit 31, a tempo converting circuit 32, and a buffer 33. In this example, it is assumed that the conversion information generating circuit 18 is a random number generator (RNG).

The pattern selecting circuit 31 categorizes a random number supplied from the conversion information generating circuit 18, which is a random number generator, as one of n groups and supplies a control signal corresponding to the categorized result to the tempo converting circuit 32. For example, the pattern selecting circuit 31 categorizes the low order one digit of a random number (decimal notation) supplied from the random number generator 18 as one of n groups. For example, the pattern selecting circuit 31 categorizes a random number as one of five groups (0 and 1), (2 and 3), (4 and 5), (6 and 7), or (8 and 9) and supplies a control signal corresponding to the categorized group to the tempo converting circuit 32.

The tempo converting circuit 32 converts the digital audio data supplied from the error interpolating circuit 9 in accordance with the control signal supplied from the pattern selecting circuit 31 and supplies the converted data to the D/A converting portion 11. For example, when the pattern selecting circuit 31 categorizes a random number as one of five groups, the tempo converting circuit 32 converts digital audio data supplied from the error interpolating circuit 9 so that the tempo of the music becomes fast, faster, same, slower, or slow in accordance with the control signal supplied from the pattern selecting circuit 31 and supplies the converted digital audio data to the D/A converting portion 11. The buffer 33 absorbs the expansion and reduction of the converted digital audio data on the time base.

Figure 3:
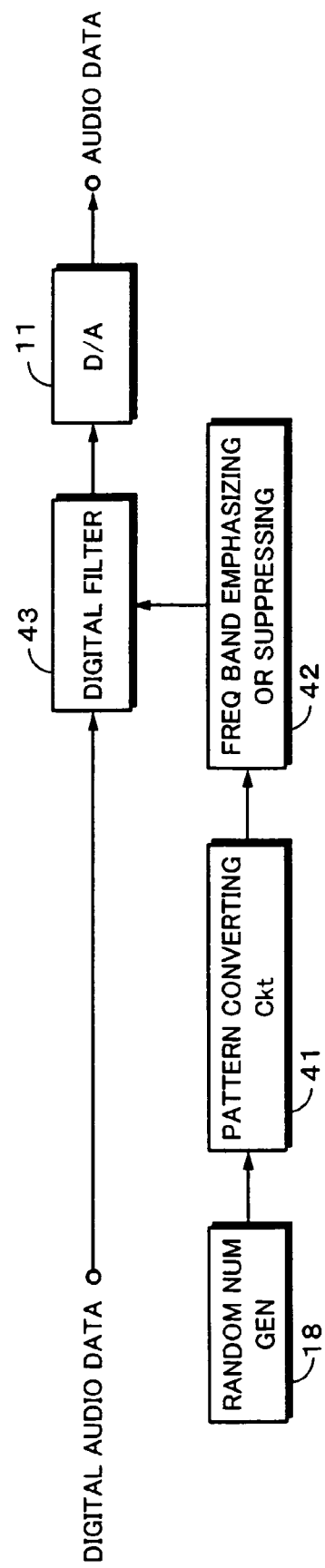
FIG. 3 is a block diagram showing another example of the structure of the first data converting circuit according to the first embodiment of the present invention.

FIG. 3 shows an example of a structure of the first data converting circuit 10 that varies emphasis or suppression of a predetermined frequency band of reproduced music. The first data converting circuit 10 comprises a pattern converting circuit 41, a frequency band emphasizing or suppressing circuit 42, and a digital filter 43. In this example, it is assumed that the conversion information generating circuit 18 is a random number generator.

The pattern converting circuit 41 assigns n/4 of n-bit data supplied from the conversion information generating circuit 18, which is a random number generator, as high frequency band emphasizing data, high frequency band suppressing data, low frequency band emphasizing data, and low frequency band suppressing data and supplies a control signal corresponding to the assigned result to the frequency band emphasizing or suppressing circuit 42. For example, when a random number of 16 bits is supplied from the conversion information generating circuit 18 to the pattern converting circuit 41, it assigns four groups of four bits of the 16 bits to the high frequency band emphasizing data, high frequency band suppressing data, low frequency band emphasizing data, and low frequency band suppressing data in the order of high order bits, converts each data into a format for data that can be handled by the frequency band emphasizing or suppressing circuit 42, and supplies the converted data thereto.

The frequency band emphasizing or suppressing circuit 42 controls the digital filter 43 in accordance with data supplied from the pattern converting circuit 41. The digital filter 43 emphasizes and suppresses a high frequency component and a low frequency component of the digital audio data under the control of the frequency band emphasizing or suppressing circuit 42. When the frequency band emphasizing or suppressing circuit 42 assigns four groups of four bits as emphasizing or suppressing data, the digital filter 43 is capable of filtering a total of 65536 patterns.

The D/A converting portion 11 converts digital audio data supplied from the first data converting circuit 10 into analog data in accordance with conversion information supplied from the conversion information generating circuit 18 through the switch 21 and supplies the analog data to the second data converting circuit 12. For example, the D/A converting portion 11 converts digital audio data supplied from the first data converting circuit 10 into analog data with quantizer bits and/or a sampling frequency in accordance with conversion information supplied through the switch 21 and supplies the analog data to the second data converting circuit 12.

The D/A converting portion 11 has for example the pattern selecting circuit 31 and a D/A converter. The D/A converter converts digital audio data supplied from the first data converting circuit 10 into analog audio data with quantizer bits and/or a sampling frequency in accordance with a control signal supplied from the pattern selecting circuit 31.

The second data converting circuit 12 converts analog audio data supplied from the D/A converting portion 11 in accordance with conversion information supplied from the conversion information generating circuit 18 through the switch 17 and supplies the converted analog audio data to the output terminal 19. The second data converting circuit 12 varies data for example in at least one of manners that a predetermined frequency band is emphasized or suppressed, the tempo is varied, a high frequency band is added, a noise is added, and an echo is added. The switches 16, 21, and 17 are turned on/off under the control of the operation device 15.

Figure 4:
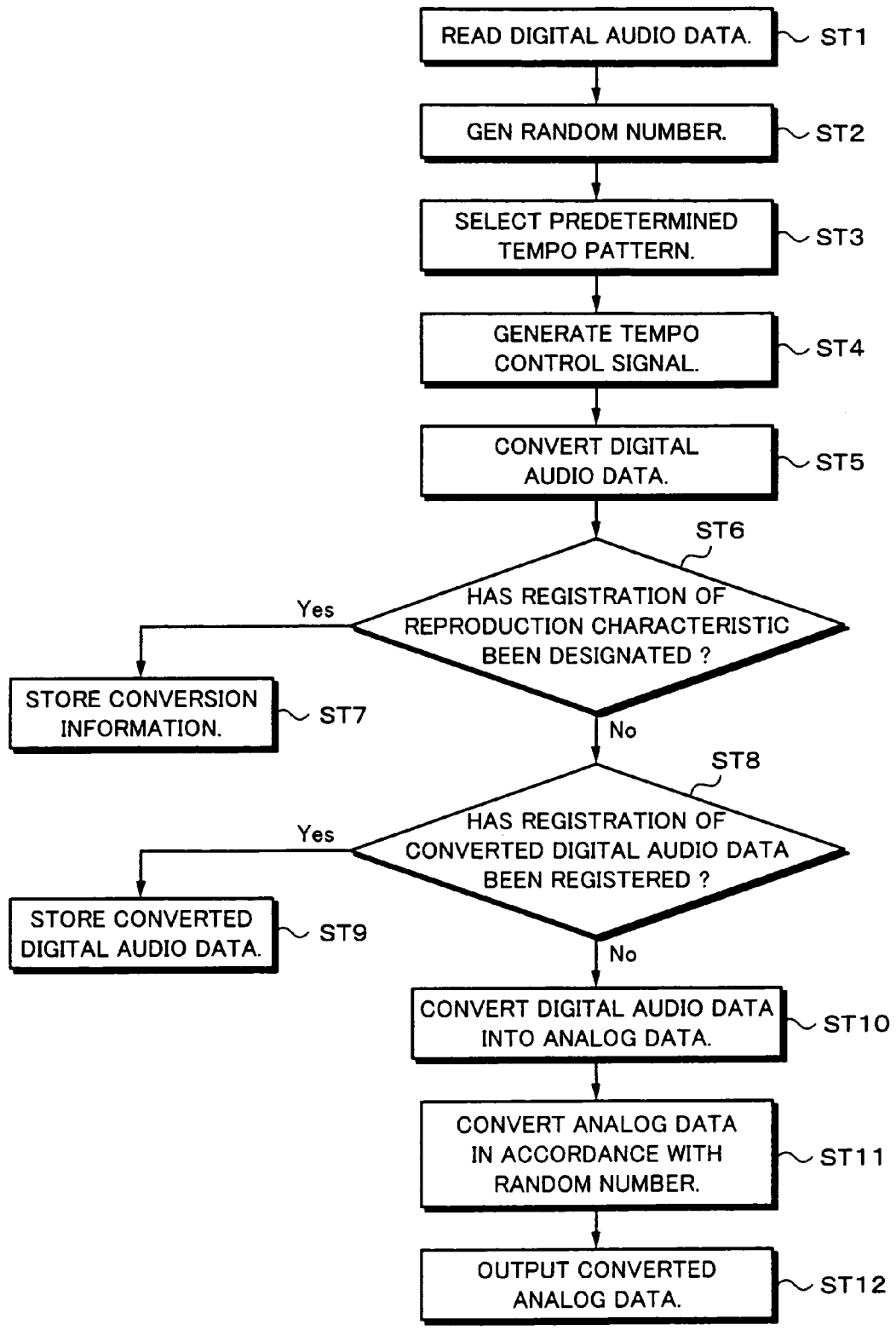
FIG. 4 is a flow chart showing a process according to the first embodiment of the present invention.

FIG. 4 is a flow chart showing a software process for varying the tempo. At step ST1, digital audio data is read from an optical disc or the like. At step ST2, a random number is generated. A predetermined tempo pattern is selected in accordance with the generated random number (at step ST3). For example, one of the foregoing five tempo patterns is selected.

At step ST4, a tempo control signal is generated in accordance with the selected tempo pattern. At step ST5, the tempo of the digital audio signal is converted in accordance with the tempo control signal. The process performed from step ST2 to step ST5 corresponds to the first data converting circuit 10.

At step ST6, it is determined whether or not registration of a reproduction characteristic has been designated. When the determined result represents that registration of a reproduction characteristic has been designated, the flow advances to step ST7. At step ST7, conversion information is stored to a memory. The memory is a recording medium on which digital audio data has been recorded or another recording medium such as a hard disk or a memory card on which digital audio data has not been recorded.

When the determined result at step ST6 represents that registration of a reproduction characteristic has not been designated, the flow advances to step ST8. At step ST8, it is determined whether or not registration of digital audio data whose tempo has been varied has been designated. When the determined result represents that registration of digital audio data has been designated, the flow advances to step ST9. At step ST9, the converted digital audio data is stored in the memory. The memory may be the same as a recording medium for conversion information.

When the determined result at step ST8 represents that registration of converted digital audio data has not been designated, the flow advances to step ST10. At step ST10, the digital audio data is converted into analog audio data. At step ST11, the analog audio data is converted in accordance with the random number. The process of step ST11 corresponds to the second data converting circuit 12. At step ST12, the converted analog data is output.

According to the first embodiment of the present invention, the following effect can be obtained.

The conversion information generating circuit 18 generates conversion information that varies whenever data is read from the optical disc 1 or once every a plurality of times it is read therefrom. The conversion information generating circuit 18 supplies the generated conversion information to the data converting portion 20. The data converting portion 20 converts data supplied from the error interpolating circuit 9 in accordance with conversion information supplied from the conversion information generating circuit 18 and supplies the converted data to the output terminal 19. Thus, sound of music or an album can be varied whenever data is reproduced from the optical disc 1. Thus, even if music or an album is repeatedly reproduced, the user can enjoy listening to it without becoming weary thereof.

In addition, like a live concert whose performance varies in each session, since performance varies whenever the user listens to music reproduced from an optical disc, he or she can listen to the music without becoming weary thereof.

Second Embodiment

Next, a data reproducing apparatus according to a second embodiment of the present invention will be described. According to the first embodiment, the present invention is applied to a data reproducing apparatus that reproduces audio data. In contrast, according to the second embodiment, the present invention is applied to a data reproducing apparatus that reproduces video data.

Figure 5:
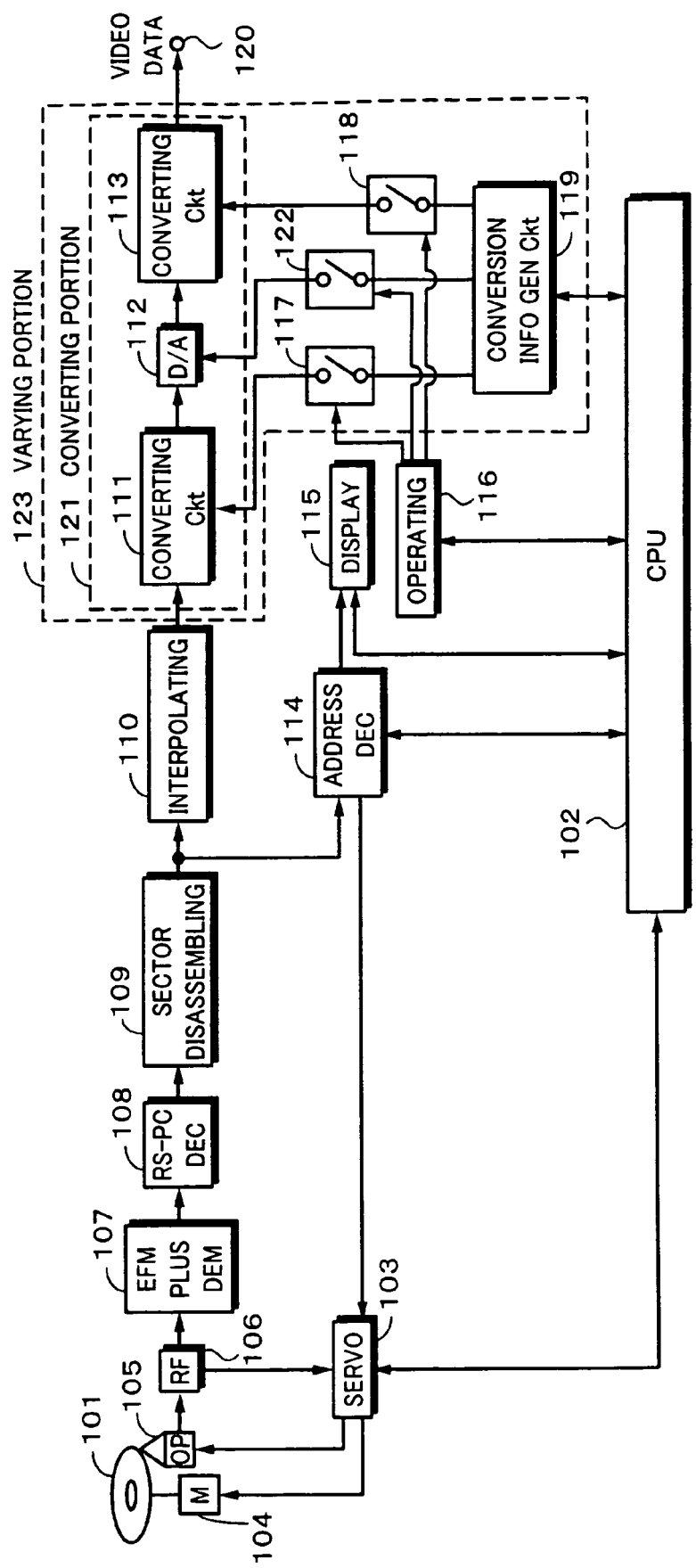
FIG. 5 is a block diagram showing an example of a structure of a data reproducing apparatus according to a second embodiment of the present invention.

FIG. 5 shows an example of a structure of the data reproducing apparatus according to the second embodiment of the present invention. As shown in FIG. 5, the data reproducing apparatus comprises a CPU 102, a servo portion 103, a spindle motor 104, an optical pickup (as reproducing means) 105, an RF amplifier 106, an EFM plus demodulating circuit 107, an Reed-Solomon product code (RS-PC) decoder 108, a sector disassembling circuit 109, an error interpolating circuit 110, a data varying portion 123, an address decoder 114, a display device 115, an operation device 116, and an output terminal 120. In FIG. 5, reference numeral 101 is an optical disc (as a recording medium) such as a DVD. The output terminal 120 is connected to a display device such as a television receiver.

As shown in FIG. 5, the data varying portion 123 comprises a data converting portion (as data converting means) 121, a switch 117, a switch 122, a switch 118, and a conversion information generating circuit (as conversion information generating means) 119. The data converting portion 121 comprises a first data converting circuit (as first data converting means) 111, a digital-analog converting portion (hereinafter referred to as D/A converting portion) (as D/A converting means) 112, and a second data converting circuit (as second data converting means) 113.

The optical disc 101 is placed on a turn table and rotated by the spindle motor 104. The spindle motor 104 is driven and rotated at a constant linear velocity (CLV) under the control of the servo portion 103. The servo portion 103 generates various servo drive signals for focus, tracking, thread, and spindle servo drives in accordance with data supplied from the address decoder 114 and operation commands supplied from the CPU 102 and outputs the generated signals to the spindle motor 104 and the optical pickup 105. The CPU 102 controls all operations of the reproducing apparatus. The CPU 102 is connected to the display device 115, the operation device 116, the address decoder 114, and the servo portion 103. The optical pickup 105 focuses an optical beam of a semiconductor laser on a signal surface of the optical disc 101 and traces tracks formed in a concentric circle shape or a spiral shape on the optical disc 101. The optical pickup 105 is moved by a thread mechanism. Digital video data that is output from the optical pickup 105 is supplied to the EFM plus demodulating circuit 107 through the RF amplifier 106.

The EFM plus demodulating circuit 107 performs EFM plus demodulation for the digital video data supplied from the RF amplifier 106 and supplies the demodulated data to the RS-PC decoder 108. The RS-PC decoder 108 corrects errors of the digital video data supplied from the EFM plus demodulating circuit 107 in accordance with RS-OC and supplies the corrected digital video data to the sector disassembling circuit 109.

The sector disassembling circuit 109 disassembles sectors of the digital video data supplied from the RS-PC decoder 108 and supplies the disassembled digital video data to the error interpolating circuit 110 and the address decoder 114. The error interpolating circuit 110 interpolates digital video data supplied from the sector disassembling circuit 109 and supplies the interpolated digital video data to the data varying portion 123.

The data varying portion 123 varies a picture of digital video data supplied from the error interpolating circuit 110 whenever data is read from the optical disc 101 or once every a plurality of times it is read therefrom and supplies the varied digital video data to the output terminal 120. The data varying portion 123 varies digital video data for example in at least one of manners that the color tone is varied, the luminance is varied, the contrast is varied, the edge is emphasized, a predetermined frequency band is emphasized or suppressed, the frame frequency is varied, the bit rate is varied, and a noise is added.

The address decoder 114 decodes data supplied from the sector disassembling circuit 109 under the control of the CPU 102 and supplies the decoded data to the display device 115 and the servo portion 103. The display device 115 is composed of for example a liquid crystal display or an FL. The display device 115 displays information in accordance with data supplied from the address decoder 114 under the control of the CPU 102. The operation device 116 has buttons or the like. With the buttons or the like, each portion of the data recording and reproducing apparatus is controlled.

The data converting portion 121 and the conversion information generating circuit 119 of the data varying portion 123 are almost the same as those of the data reproducing apparatus according to the first embodiment. Thus, their description will be omitted.

Next, the operation of each portion of the data converting portion 121 will be described. the first data converting circuit 111 converts digital video data supplied from the error interpolating circuit 110 in accordance with conversion information supplied from the conversion information generating circuit 119 through the switch 117 and supplies the converted data to the D/A converting portion 112. In other words, the first data converting circuit 111 varies a picture of the digital video data supplied from the error interpolating circuit 110 whenever data is read from the optical disc 101 or once every a plurality of times it is read therefrom and supplies the varied digital video data to the D/A converting portion 112. The first data converting circuit 111 varies a picture of digital video data for example in at least one of manners that the color tone is varied, the luminance is varied, the contrast is varied, the edge is emphasized, a predetermined frequency band is emphasized or suppressed, the bit rate is varied, and a noise is added.

The D/A converting portion 112 converts digital video data supplied from the first data converting circuit 111 into analog video data in accordance with conversion information supplied from the conversion information generating circuit 119 through the switch 122 and supplies the converted analog video data to the second data converting circuit 113. For example, the D/A converting portion 112 converts digital video data supplied from the first data converting circuit 111 into analog video data with a flame frequency in accordance with conversion information supplied through the switch 122 and supplies the analog video data to the second data converting circuit 113.

The second data converting circuit 113 converts analog video data supplied from the D/A converting portion 112 in accordance with conversion information supplied from the conversion information generating circuit 119 through the switch 118 and supplies the converted data to the output terminal 120. In other words, the first data converting circuit 111 varies a picture of digital video data supplied from the error interpolating circuit 110 whenever data is read from the optical disc 101 or once every a plurality of times it is read therefrom and supplies the varied digital video data to the D/A converting portion 112. The second data converting circuit 113 varies a picture of digital video data for example in at least one of manners that the color tone is varied, the luminance is varied, the contrast is varied, the edge is emphasized, a predetermined frequency band is emphasized or suppressed, the bit rate is varied, and a noise is added.

Figure 6:
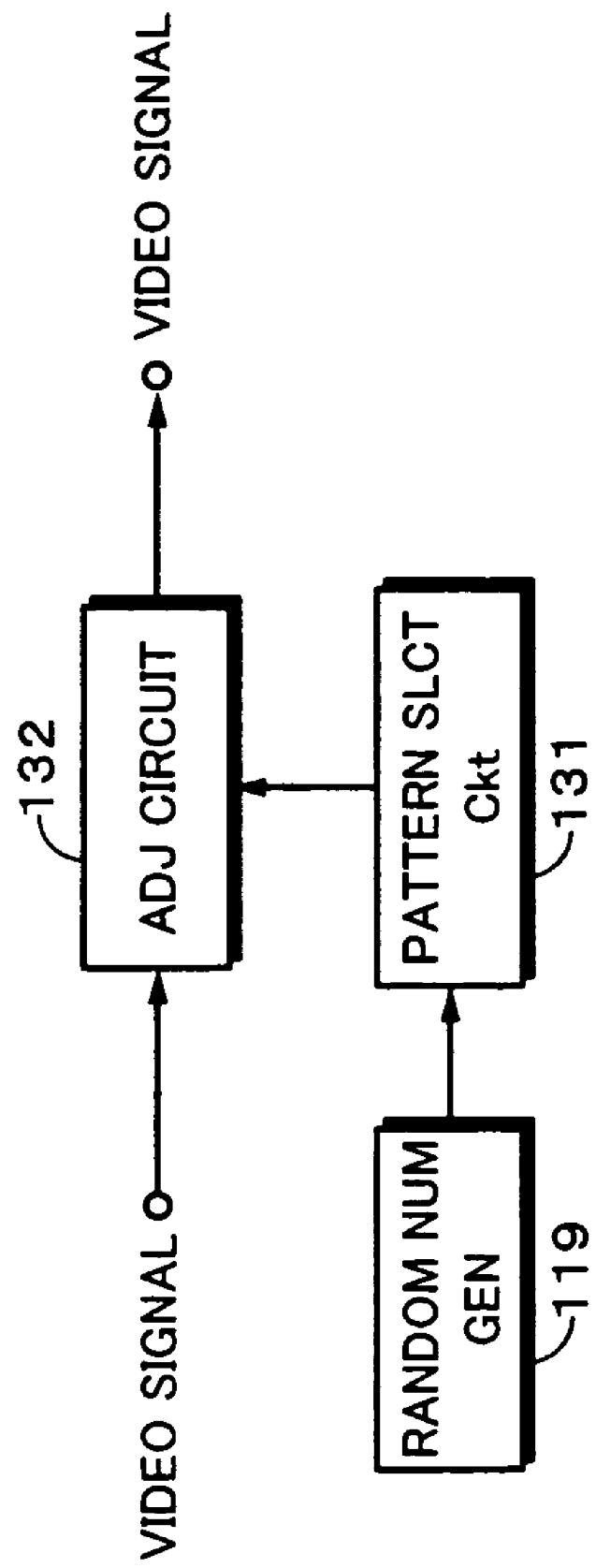
FIG. 6 is a block diagram showing an example of a structure of a second data converting circuit according to the second embodiment of the present invention.

FIG. 6 shows an example of a structure of the second data converting circuit 113 that varies a picture in manners that the luminance and color tone thereof are varied. As shown in FIG. 6, the second data converting circuit 113 comprises a pattern selecting circuit 131 and an adjusting circuit 132. In this example, it is assumed that the conversion information generating circuit 119 is a random number generator.

The pattern selecting circuit 131 categorizes a random number supplied from the conversion information generating circuit 119, which is a random number generator, as one of n groups and supplies a control signal to the adjusting circuit 132 in accordance with the categorized result.

The adjusting circuit 132 varies a picture of digital video data supplied from the error interpolating circuit 110 in accordance with a control signal supplied from the pattern selecting circuit 131 in manners that the luminance and the color tone are varied and supplies the varied digital video data to the output terminal 120.

Figure 7:
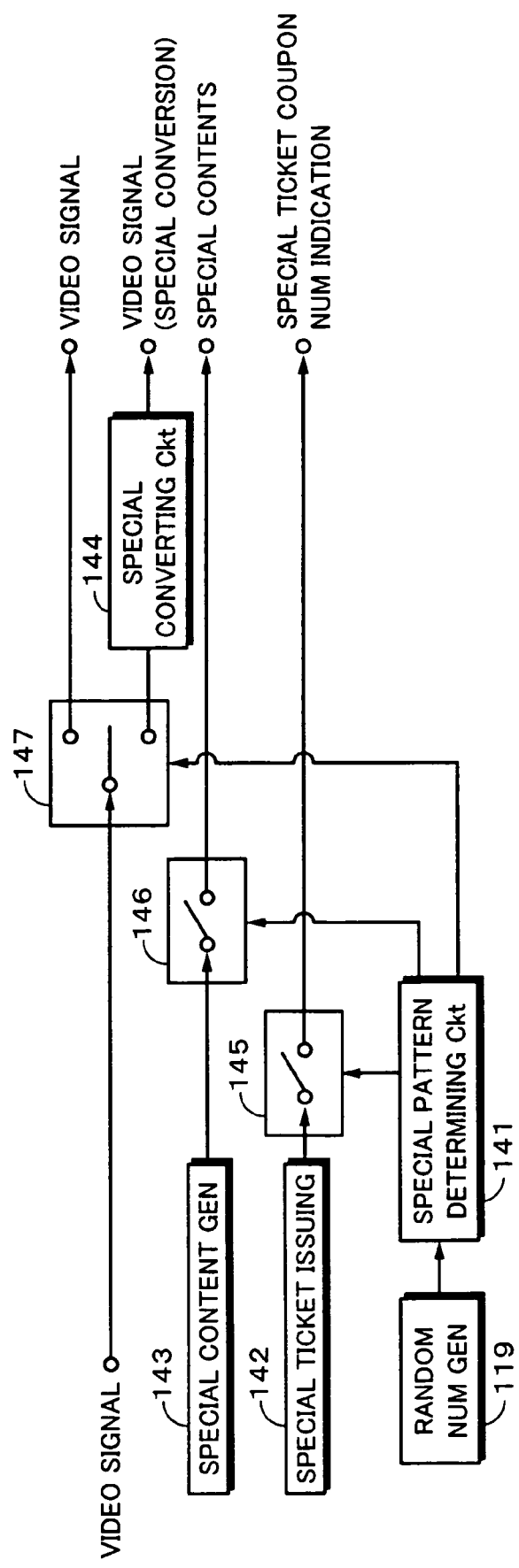
FIG. 7 is a block diagram showing another example of the structure of the second data converting circuit according to the second embodiment of the present invention.

FIG. 7 shows an example of the second data converting circuit 113 that displays special contents or the like. As shown in FIG. 7, the second data converting circuit 113 comprises a special pattern determining circuit 141, a special ticket issuing circuit 142, a special content generating circuit 143, a special converting circuit 144, a switch 145, a switch 146, a switch 147, and an adding circuit (not shown). In this example, it is assumed that conversion information generating circuit 119 is a random number generator.

The special pattern determining circuit 141 determines whether or not a random number supplied from the conversion information generating circuit 119, which is a random number generator, is the same as a predetermined numeric value. When the determined result represents that the random number is the same as the predetermined numeric value, the special pattern determining circuit 141 causes the switches 145, 146, and 147 to be turned on. In contrast, when the determined result represents that the random number is not the same as the predetermined numeric value, the special pattern determining circuit 141 causes the switches 145, 146, and 147 to be turned off.

The special ticket issuing circuit 142 generates encryption information such as encryption text or encryption number and supplies the generated encryption information to the adding circuit through the switch 145. The encryption information is information with which for example a special ticket can be obtained.

The special content generating circuit 143 generates contents that the user does not know and supplies them to the adding circuit through the switch 146. The contents are data for example a picture of fireworks or the like. When the special pattern determining circuit 141 has determined that the random number supplied from the random number generator 119 is the same as the predetermined numeric value, a user's picture may be displayed. In this case, the user's picture data is pre-stored in a storing portion such as a memory.

The special converting circuit 144 varies a picture of analog video data supplied from the D/A converting portion 112 and supplies the varied analog video data to the adding circuit.

The adding circuit adds signals supplied from the special ticket issuing circuit 142, the special content generating circuit 143, and the special converting circuit 144 and supplies the added signal to the output terminal 120.

Figure 8:
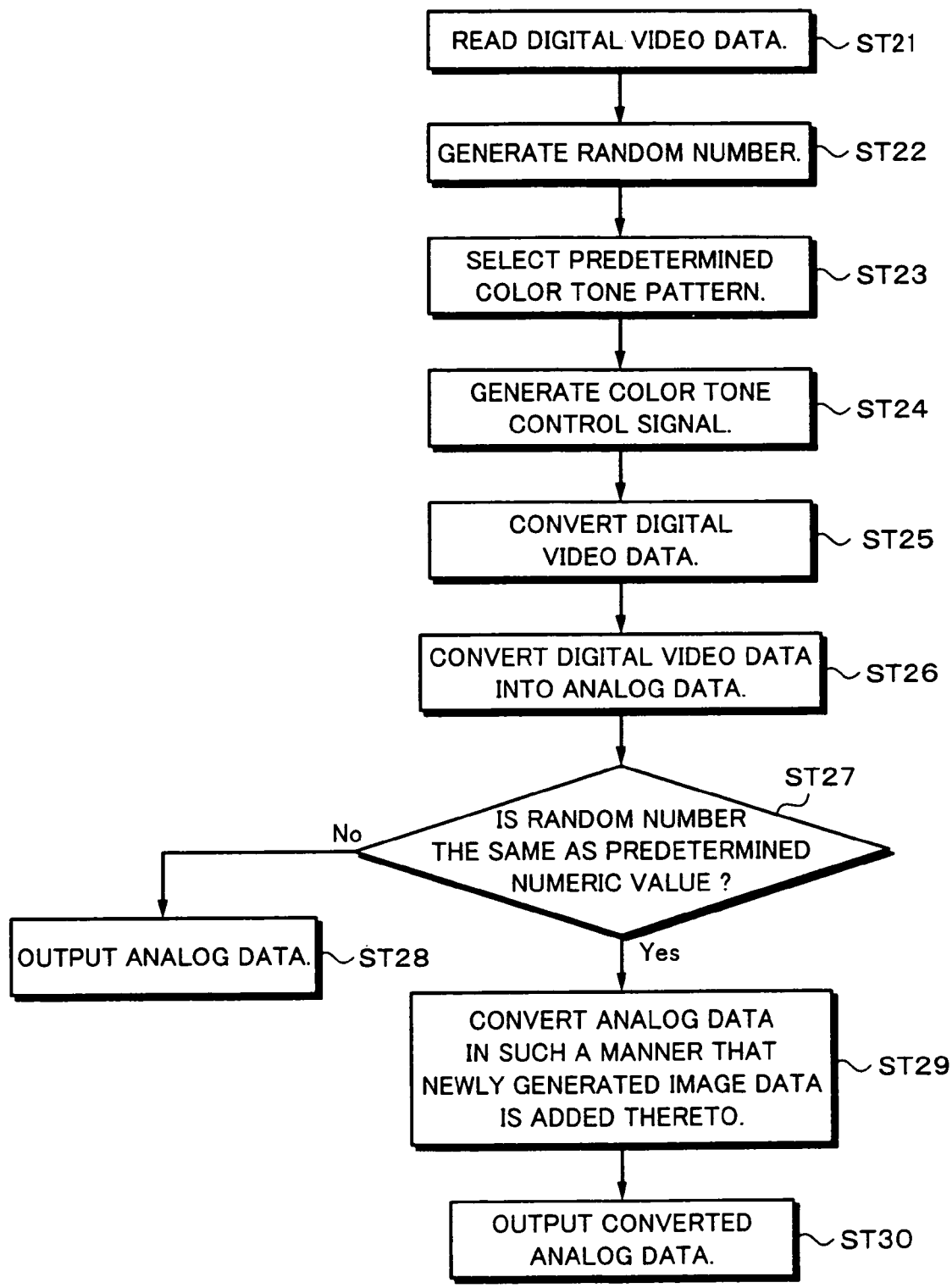
FIG. 8 is a flow chart showing a process according to the second embodiment of the present invention.

FIG. 8 is a flow chart showing a software process for varying a color tone of video data and displaying special contents or the like. At step ST21, digital video data is read from an optical disc or the like. At step ST22, a random number is generated. A predetermined color tone pattern is selected in accordance with the generated random number (at step ST23).

At step ST24, a color tone control signal is generated in accordance with the color tone pattern. At step ST25, the color tone of the digital video data is varied in accordance with the color tone control signal. The process performed from step ST22 to step ST25 corresponds to the first data converting circuit 111.

At step ST26, the digital video data is converted into analog video data. At step ST27, it is determined whether or not the random number generated at the random number generating step ST27 is the same as a predetermined random number. When they are not the same, analog data is output (at step ST28).

When the determined result at step ST27 represents that they are the same, the flow advances to step ST28. At step ST28, the analog data is converted in such a manner that newly generated image data is added to the analog data. As described above, the newly generated image is encryption information with which a ticket can be obtained, an image that the user does not know, or an image that the user knows. The process performed from step ST27 to step ST30 corresponds to the second data converting circuit 113.

According to the second embodiment, the following effect can be obtained.

The conversion information generating circuit 119 generates conversion information that varies whenever video data is read from the optical disc 101 or once every a plurality of times it is read therefrom and supplies the conversion information to the data converting portion 121. The data converting portion 121 converts the data supplied from the error interpolating circuit 110 in accordance with the conversion information supplied from the conversion information generating circuit 119 and supplies the converted data to the output terminal 120. As a result, an image or picture as contents such as a movie can be varied whenever it is reproduced from a disc. Thus, even if contents such as a movie are repeatedly reproduced, the user can enjoy watching them without becoming weary thereof.

Third Embodiment

Next, a third embodiment of the present invention will be described. The third embodiment of the present invention is a data recording and reproducing apparatus that allows a reproduction characteristic of sound that the user wants to vary to be registered to an optical disc and/or a memory of the data recording and reproducing apparatus.

Figure 9:
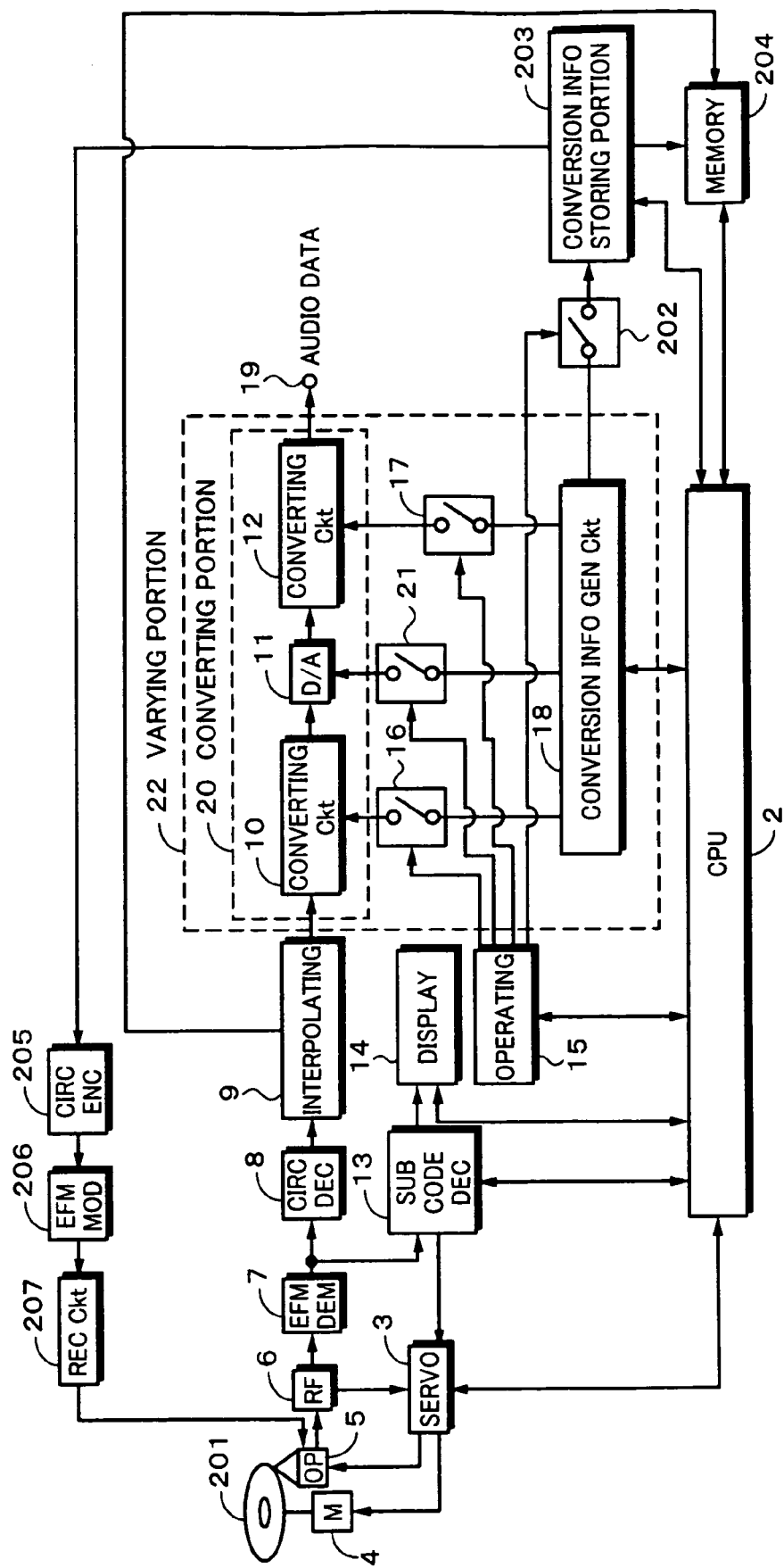
FIG. 9 is a block diagram showing an example of a structure of a data recording and reproducing apparatus according to a third embodiment of the present invention.

FIG. 9 shows an example of a structure of the data recording and reproducing apparatus according to the third embodiment of the present invention. In FIG. 9, similar portions to those of the data reproducing apparatus according to the first embodiment will be denoted by similar reference numerals and their description will be omitted.

As shown in FIG. 9, the data recording and reproducing apparatus comprises a CPU 2 (as controlling means), a servo portion 3, a spindle motor 4, an optical pickup (a recording and reproducing means) 5, an RF amplifier 6, an EFM demodulating circuit 7, a CIRC decoder 8, an error interpolating circuit 9, a sub code decoder 13, a display device 14, an operation device 15, a data varying portion (as data varying means) 22, an output terminal 19, a switch 202, a conversion information storing portion 203, a memory 204, a CIRC encoder 205, an EFM modulating circuit 206, and a recording circuit 207. In FIG. 9, reference numeral 201 represents for example a compact disc recordable (CD-R) disc or a compact disc rewritable (CD-RW) disc. The output terminal 19 is connected to for example an amplifier. Alternatively, a data processing portion that processes conversion information that is read from the memory 204 and supplies the conversion information to the recording circuit 207 may be disposed instead of the CIRC encoder 205 and the EFM modulating circuit 206.

The data varying portion 22 comprises a data converting portion (as data converting means) 20, a switch 16, a switch 21, a switch 17, and a conversion information generating circuit (as conversion information generating means) 18. The data converting portion 20 comprises a first data converting circuit (as first data converting means) 10, a D/A converting circuit (as D/A converting means) 11, and a second data converting circuit (as second data converting means) 12. The first data converting circuit 10, the D/A converting portion 11, and the second data converting circuit 12 are connected to the CPU 2 (their connections are not shown).

The switch 202 is turned on/off under the control of the operation device 15. The conversion information storing portion 203 stores conversion information supplied from the conversion information generating circuit 18 through the switch 202. The conversion information storing portion 203 supplies stored conversion information to the memory 204 and/or the CIRC encoder 205. The memory 204 stores conversion information supplied from the conversion information storing portion 203. The CIRC encoder 205 encodes the conversion information supplied from the conversion information storing portion 203 in accordance with CIRC and supplies the encoded conversion information to the EFM modulating circuit 206. The EFM modulating circuit 206 modulates the conversion information supplied from the CIRC encoder 205 in accordance with EFM and supplies the conversion information to the recording circuit 207. The recording circuit 207 has a drive circuit. An output of the recording circuit 207 is supplied to a semiconductor laser of the optical pickup 5. The optical pickup 5 radiates to the optical pickup 201 a laser beam whose intensity is modulated in accordance with record data.

Next, an example of the operation of the data recording and reproducing apparatus according to the third embodiment of the present invention will be described. First of all, an example of an operation that causes varied sound to be registered to the optical disc 201 will be described. The conversion information storing portion 203 stores conversion information supplied from the conversion information generating circuit 18 through the switch 202. When the operation that causes the varied sound to be registered to the optical disc 201 is performed with the operation device 15, conversion information is read from the conversion information storing portion 203 under the control of the CPU 2. The conversion information is supplied to the optical pickup 5 through the CIRC encoder 205, the EFM modulating circuit 206, and the recording circuit 207. The optical pickup 5 records to a conversion information recording region of the optical disc 201 the conversion information supplied from the conversion information storing portion 203 through the CIRC encoder 205, the EFM modulating circuit 206, and the recording circuit 207. The conversion information recording region is for example a lead-in region, a lead-out region, or a special region that is disposed on an inner periphery side of the lead-in region.

Next, an example of the data reproducing operation of varied sound registered on the optical disc 201 will be described. When the optical disc 201 is placed on a tray and loaded into the data recording and reproducing apparatus, the optical pickup 5 reads conversion information from the conversion information recording region of the optical disc 201 and stores the conversion information in the memory 204 through the RF amplifier 6, the EFM demodulating circuit 7, the CIRC decoder 8, and the error interpolating circuit 9. When the operation that causes data to be reproduced in accordance with varied sound registered on the optical disc 201 is performed with the operation device 15, the conversion information is read from the memory 204 under the control of the CPU 2 and supplied to the data converting portion 20. The data converting portion 20 converts audio data that is read from the optical disc 201 in accordance with conversion information that is read from the memory 204 and supplies the converted audio data to the output terminal 19.

Next, an example of an operation that causes desired varied sound to be registered to the data recording and reproducing apparatus and data to be reproduced in accordance with the registered varied sound will be described. First of all, the conversion information storing portion 203 stores conversion information supplied from the conversion information generating circuit 18 through the switch 202. When the operation that causes varied sound to be registered to the data recording and reproducing apparatus is performed with the operation device 15, conversion information is read from the conversion information storing portion 203 under the control of the CPU 2 and stored in the memory 204.

When the operation that causes data to be reproduced in accordance with varied sound registered in the data recording and reproducing apparatus is performed with the operation device 15, conversion information is read from the memory 204 under the control of the CPU 2 and supplied to the data converting portion 20. The data converting portion 20 converts audio data that is read from the optical disc 201 in accordance with the conversion information that is read from the memory 204 and supplies the converted audio data to the output terminal 19.

The operation that cause conversion information to be stored to the memory and the operation that causes converted digital audio data to be registered thereto according to the third embodiment of the present invention can be accomplished by a software process in accordance with the flow chart shown in FIG. 4.

Figure 10:
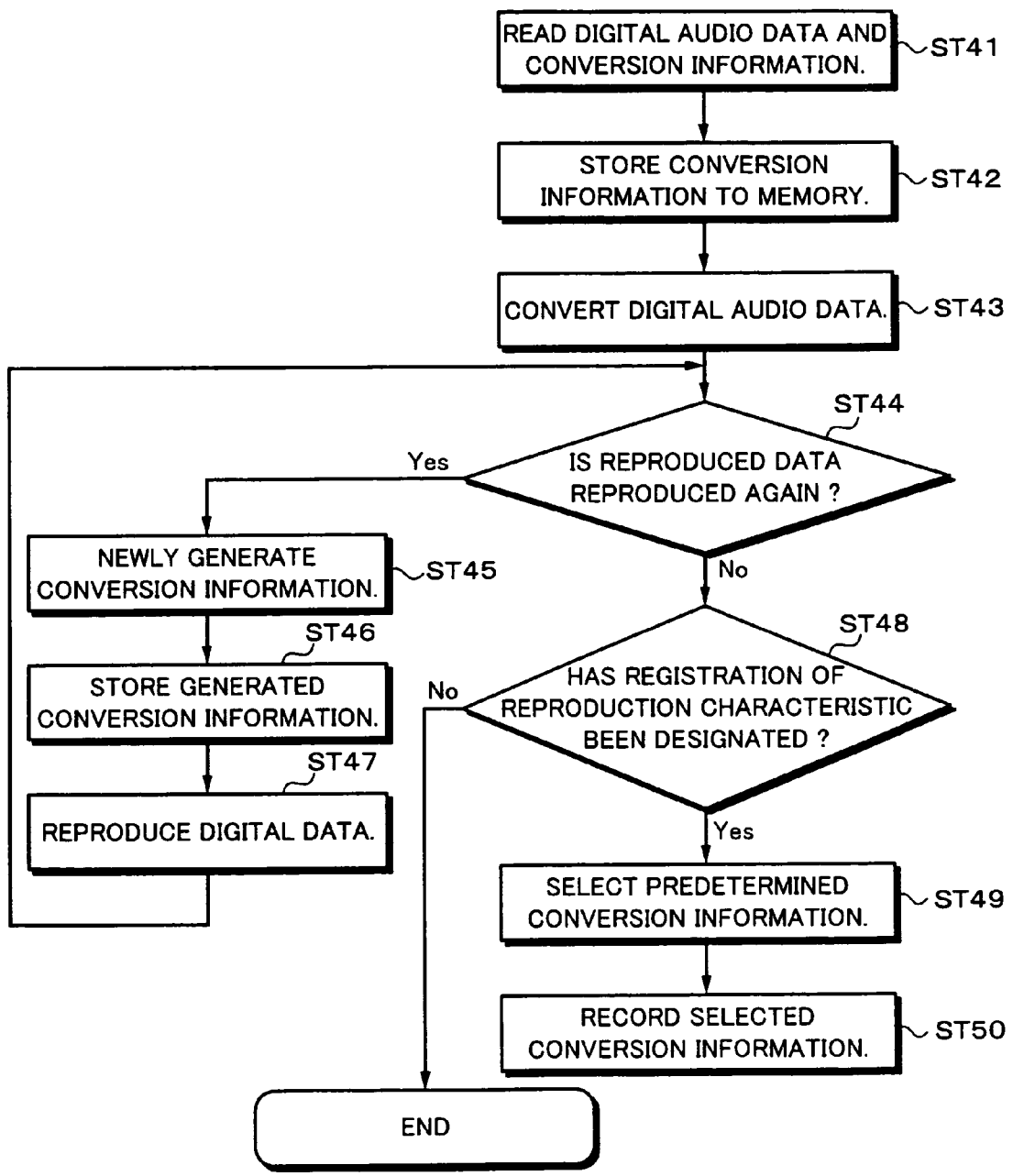
FIG. 10 is a flow chart showing a process according to the third embodiment of the present invention.

The data reproducing process for reproducing data in accordance with registered varied sound according to the third embodiment of the present invention can be accomplished as a software process in accordance with a flow chart shown in FIG. 10. At step ST41, digital audio data and conversion information are read from a recording medium such as a disc. The conversion information is stored in the memory (at step ST42).

At step ST43, digital audio data is converted in accordance with the conversion information that is read from the recording medium. At step ST43, it is determined whether or not reproduced data is reproduced again. When the determined result represents that the reproduced data is reproduced again, since varied sound is varied whenever data is reproduced, the flow advances to step ST45. At step ST45, new conversion information is generated. At step ST46, the generated conversion information is stored in the memory.

At step ST47, digital data is reproduced in accordance with the generated conversion information. Thereafter, the flow returns to step ST44. At step ST44, it is determined whether or not the data is reproduced again.

When the determined result at step ST44 represents that the reproduced data is not reproduced again, the flow advances to step ST48. At step ST48, it is determined whether or not registration of a reproduction characteristic has been designated. When the determined result represents that registration has not been designated, the process is completed. When the determined result represents that registration has been designated, the flow advances to step ST49. At step ST49, predetermined conversion information is selectively read from the memory. At step ST50, the selected conversion information is recorded in the lead-in region or the like of the record medium.

According to the third embodiment of the present invention, in addition to the effect of the first embodiment, the following effect can be obtained.

Sound that varies whenever data is read from a disc or once every a plurality of times it is read therefrom can be selected by the user and the selected varied sound can be recoded on the optical disc 201 and/or the memory 204. As a result, the user can enjoy reproducing varied sound that he or she has wants.

Fourth Embodiment

Next, a fourth embodiment of the present invention will be described. A data recording and reproducing apparatus according to the fourth embodiment allows a reproduction characteristic such as a varied picture that the user wants to be registered to an optical disc and/or a memory of the data recording and reproducing apparatus.

Figure 11:
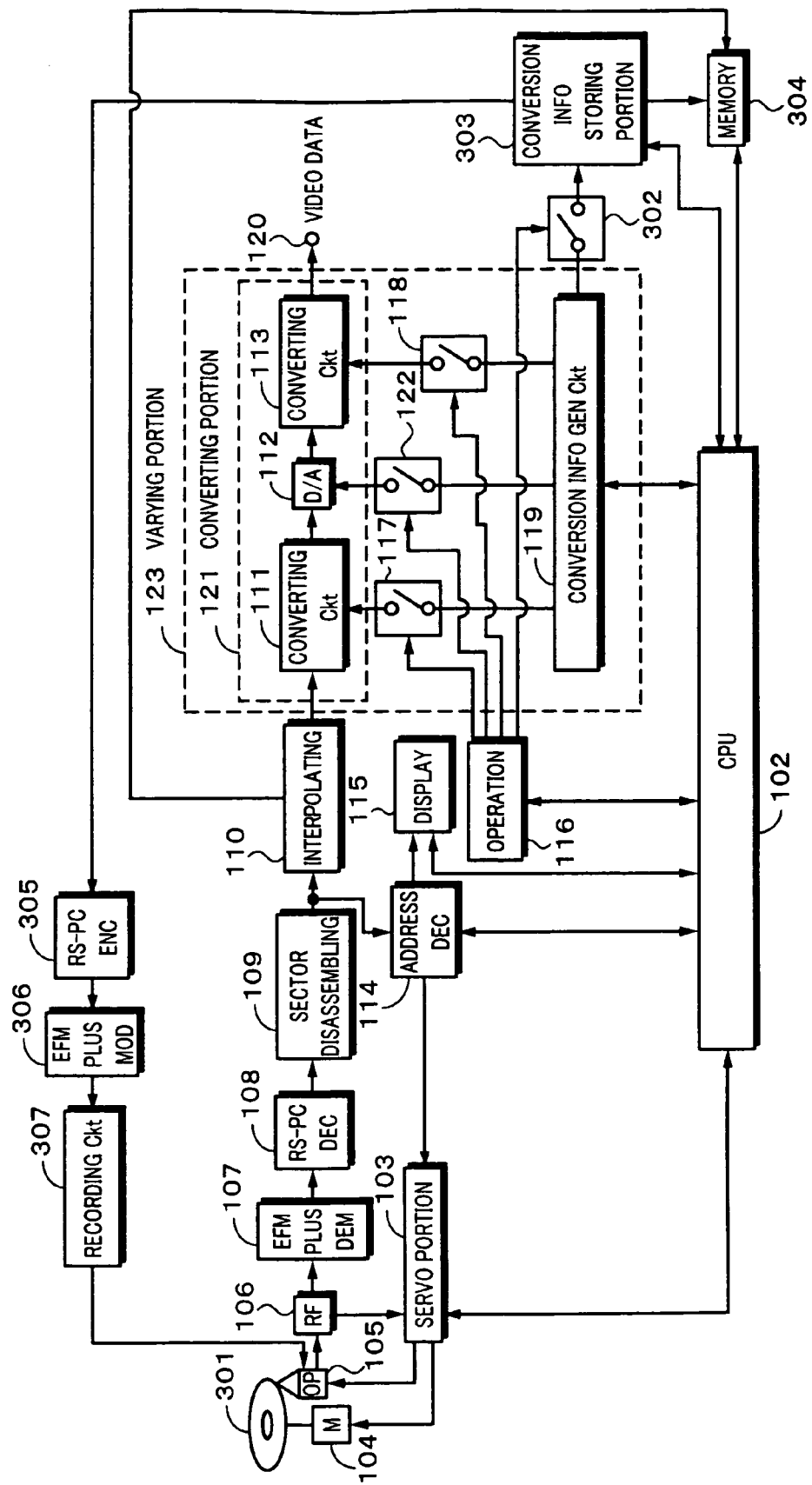
FIG. 11 is a block diagram showing an example of a structure of a data recording and reproducing apparatus according to a fourth embodiment of the present invention.

FIG. 11 shows an example of a structure of the data recording and reproducing apparatus according to the fourth embodiment. In FIG. 11, similar portions to those of the data recording and reproducing apparatus according to the second embodiment will be denoted by similar reference numerals.

As shown in FIG. 11, the data recording and reproducing apparatus comprises a CPU 102, a servo portion 103, a spindle motor 104, an optical pickup (as recording and reproducing means) 105, an RF amplifier 106, an EFM plus demodulating circuit 107, an RS-PC decoder 108, a sector disassembling circuit 109, an error interpolating circuit 110, a data varying portion 123, an address decoder 114, a display device 115, an operation device 116, an output terminal 120, a switch 302, a conversion information storing portion 303, a memory 304, an RS-PC encoder 305, an EFM plus modulating circuit 306, and a recording circuit 307. In FIG. 11, reference numeral 301 represents a rewritable optical disc or a recordable optical disc. The optical disc 301 is for example a digital versatile disc-recordable (DVD-R) disc or a digital versatile disc-rewritable (DVD-RAM) disc. The output terminal 120 is connected to a display device such as a television receiver. Alternatively, a data processing portion that processes conversion information that is read from the memory 304 and supplying the processed conversion information to the recording circuit 307 may be disposed instead of the RS-PC encoder 305 and the EFM plus modulating circuit 306.

The data varying portion 123 comprises a data converting portion (as data converting means) 121, a switch 117, a switch 122, a switch 118, and a conversion information generating circuit (as conversion information generating means) 119. The data converting portion 121 comprises a first data converting circuit (as first data converting means) 111, a D/A converting portion (as D/A converting means) 112, and a second data converting circuit (as second data converting means) 113. The first data converting circuit 111, the D/A converting portion 112, and the second data converting circuit 113 are connected to the CPU 102 (their connections are not shown).

The switch 302 is turned on/off under the control of the operation device 116. The conversion information storing portion 303 stores conversion information supplied from the conversion information generating circuit 119 through the switch 302. The stored conversion information is supplied to the memory 304 and/or the RS-PC encoder 305 under the control of the CPU 102. The memory 304 stores conversion information supplied from the conversion information storing portion 303. The RS-PC encoder 305 encodes the conversion information supplied from the conversion information storing portion 303 in accordance with RS-PC and supplies the encoded conversion information to the EFM plus modulating circuit 306. The EFM plus modulating circuit 306 modulates the conversion information supplied from the RS-PC encoder 305 in accordance with EFM plus system and supplies the modulated conversion information to the recording circuit 307. The recording circuit 307 has a drive circuit. An output of the recording circuit 307 is supplied to a semiconductor laser of the optical pickup 105. As a result, the optical pickup 105 radiates to the optical disc 301 a laser beam whose intensity is modulated in accordance with record data.

Next, an example of an operation of the data recording and reproducing apparatus according to the fourth embodiment of the present invention will be described. First of all, an example of an operation that causes a desired varied picture to be registered to the optical disc 301 will be described. The conversion information storing portion 303 stores conversion information supplied from the conversion information generating circuit 119. When an operation that causes a varied picture to be registered to the optical disc 301 is performed with the operation device 116, conversion information is read from the conversion information storing portion 303 under the control of the CPU 102 and supplied to the optical pickup 105 through the RS-PC encoder 305, the EFM plus modulating circuit 306, and the recording circuit 307. The optical pickup 105 records to a conversion information recording region of the optical disc 301 the conversion information supplied from the conversion information storing portion 303 through the RS-PC encoder 305, the EFM plus modulating circuit 306, and the recording circuit 307. The conversion information recording region is for example a lead-in region, a lead-out region, or a special region that is disposed on an inner periphery side of the lead-in region.

Next, an example of a data reproducing operation in accordance with a varied picture registered on the optical disc 301 will be described. First of all, when the optical disc 301 is placed on a tray and loaded into the data recording and reproducing apparatus, the optical pickup 105 reads conversion information from a conversion information recording region of the optical disc 301. The conversion information is stored in the memory 304 through the RF amplifier 106, the EFM plus demodulating circuit 107, the RS-PC decoder 108, the sector disassembling circuit 109, and the error interpolating circuit 110. When an operation that causes data to be reproduced in accordance with a varied picture registered on the optical disc 301 is performed with the operation device 116, conversion information is read from the memory 304 under the control of the CPU 102 and supplied to the data converting portion 121. The data converting portion 121 converts digital video data that is read from the optical disc 301 in accordance with the conversion information that is read from the memory 304 and supplies the converted digital video data to the output terminal 120.

Next, an example of an operation that causes a desired varied picture to be registered to the data recording and reproducing apparatus and data to be reproduced in accordance with the registered varied picture will be described. The conversion information storing portion 303 stores conversion information supplied from the conversion information generating circuit 119 through the switch 302. When an operation that causes a varied picture to be registered to the data recording and reproducing apparatus is performed with the operation device 116, conversion information is read from the conversion information storing portion 303 under the control of the CPU 102 and stored in the memory 304.

When an operation that causes data to be reproduced in accordance with a varied picture registered in the data recording and reproducing apparatus is performed with the operation device 116, conversion information is read from the memory 304 under the control of the CPU 102 and supplied to the data converting portion 121. The data converting portion 121 converts digital video data that is read from the optical disc 301 in accordance with conversion information that is read from the memory 304 and supplies the converted digital video data to the output terminal 120.

According to the fourth embodiment, in addition to the effect of the second embodiment, the following effect can be obtained.

A picture that varies whenever data is read from a disc or once every a plurality of times it is read therefrom can be selectively recorded on the optical disc 301 and/or the memory 304. Thus, the user can enjoy watching a varied picture that he or she selectively reproduces from a disc.

Although the present invention has been shown and described with respect to the first to fourth embodiments thereof, it should be understood by those skilled in the art that the foregoing and various other changes, omissions, and additions in the form and detail thereof may be made therein without departing from the spirit and scope of the present invention.

It should be noted that numeric values in the first to fourth embodiments are just examples. Thus, other numeric values can be used for the first to fourth embodiments of the present invention.

In the first and third embodiments, the data varying portion 22 may vary data in one of manners that a predetermined frequency band is emphasized or suppressed, the sound volume is varied, the number of quantizer bits is varied, the sampling frequency is varied, the bit rate is varied, the tempo is varied, a high frequency band is added, a noise is added, and an echo is added.

In the first to fourth embodiments, an example of which a digital signal that is read from an optical disc is processed by a signal processing circuit is described. However, it should be noted that the signal processing circuit can be substituted with a program.

In addition, in the data reproducing apparatus according to the first embodiment, the user may register his or her desired varied sound. In reality, the data reproducing apparatus may further comprise a storing portion (as storing means) that is composed of for example a non-volatile memory or a magnetic hard disk. When the user registers varied sound, he or she operates the operation device 15 so as to store conversion information used to convert reproduced data to the storing portion. At this point, a title that the user wants may be correlatively stored along with the conversion information. When data is reproduced in accordance with registered conversion information that the user has registered, the operation device 15 is operated so that conversion information is read from the storing portion and stored to the data converting portion 20. It is clear that in the data reproducing apparatus according to the second embodiment, a varied picture that the user wants can be registered to the storing portion.

In addition, according to the first to fourth embodiments, the conversion information generating circuit may comprise at least two of a random number generator, a timer, a pressure sensor, and a GPS receiver. The conversion information generating circuit may perform an integrating process for information that is output from those portions and supply the integrated information to the data converting portion.

Figure 12:
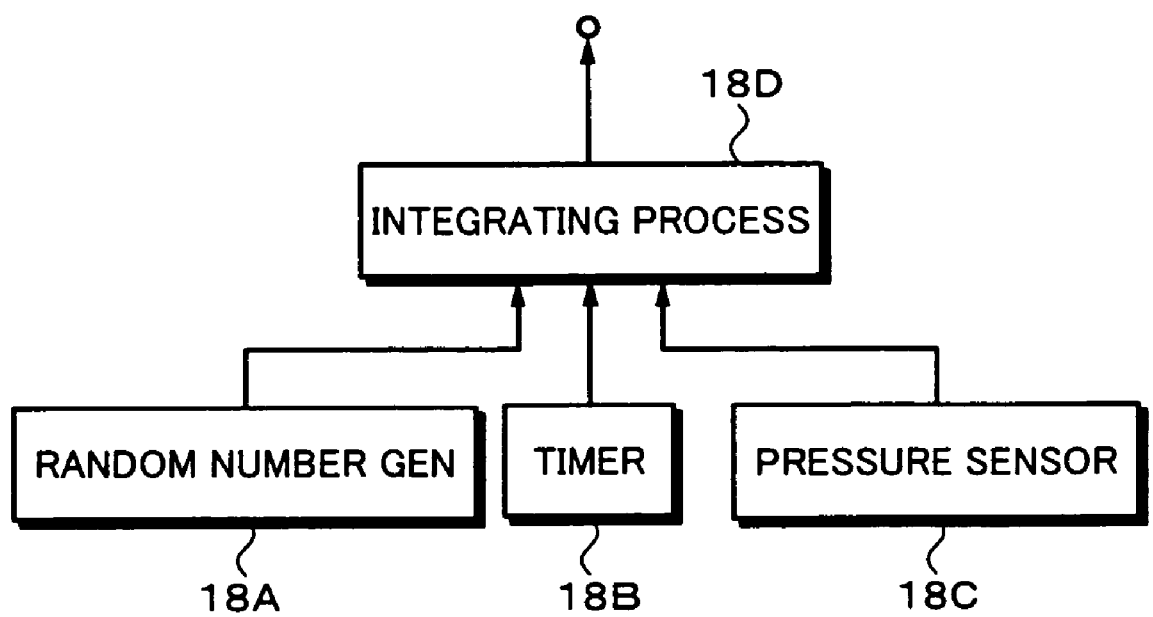
FIG. 12 is a block diagram showing an example of a structure of a conversion information generating circuit according to a modification of the present invention.

FIG. 12 shows an example of a structure of a conversion information generating circuit. As shown in FIG. 12, the conversion information generating circuit comprises a random number generator 18A, a timer 18B, a pressure sensor 18C, and an integrating process portion 18D. The integrating process portion 18D integrates a random number, time information, and operation information supplied from the random number generator 18A, the timer 18B, and the pressure sensor 18C and supplies the integrated information to the data converting portion 20.

In addition, according to the first to fourth embodiments, the present invention is applied to a data reproducing apparatus and a data recording and reproducing apparatus that reproduce data from a CD and a DVD. In addition, the present invention can be applied to a data reproducing apparatus and a data recording and reproducing apparatus that reproduce data from at least one of a CD, a DVD, a mini disc (MD), a magneto-optical (MO) disc, and a blu-ray disc.

In addition, it is clear that the present invention can be applied to a data reproducing apparatus that reproduces data from a magnetic recording medium such as a video tape or a cassette tape. Moreover, it is clear that the present invention can be applied to a data reproducing apparatus that reproduces data from a semiconductor memory.

In addition, it is clear that the present invention can be applied to a data reproducing and recoding apparatus that records and reproduces data to and from a magnetic recording medium such as a hard disk drive (HDD), a video tape, or a cassette tape. Moreover, it is clear that the present invention can be applied to a data recording and reproducing apparatus that records and reproduces data to and from a semiconductor memory.

According to the first and third embodiments, the data converting portion 20 may comprise at least one of the first data converting circuit 10 that converts digital data supplied from the error interpolating circuit 9 in accordance with conversion information supplied from the conversion information generating circuit 18 and the second data converting circuit 12 that converts analog data supplied from the D/A converting portion 11 in accordance with conversion information supplied from the conversion information generating circuit 18. Likewise, it is clear that such a structure can be applied to the second and fourth embodiments.

According to the first to fourth embodiments, an example of which digital data that is read from an optical disc is converted in accordance with conversion information is described. Alternatively, digital data that is supplied through a network and/or a communication may be converted in accordance with conversion information.

In addition, according to the first and third embodiments, the data varying portion 22 may vary data whenever it is read from a disc or once every a plurality of times it is read therefrom. For example, when reproduction of music is designated with the operation device 15, if the music is the same as the preceding reproduction, the conversion information generating circuit 18 generates conversion information that varies from that of the preceding reproduction and supplies the generated conversion information to the data converting portion 20 through the switches 16, 21, and 17. Alternatively, when a plurality of times of reproduction of music is designated with the operation device 15, the conversion information generating circuit 18 generates conversion information that is different from the preceding data conversion and supplies the generated conversion information to the data converting portion 20 through the switches 16, 21, and 17. It is clear that such an operation can be applied to the second and fourth embodiments.

What is claimed is:

1. A data reproducing apparatus, comprising:
   reproducing means for reading multimedia data from a recording medium; and
   data varying means for varying the multimedia data that is read from the recording medium whenever the multimedia data is read therefrom or once every a plurality of times the multimedia data is read therefrom, based on environmental information, the environmental information including at least one of a temperature, humidity, atmospheric pressure, brightness, wind rate, or wind direction.

2. The data reproducing apparatus as set forth in claim 1, further comprising:
   storing means for storing data; and
   controlling means for storing to the storing means the conversion information used to convert the multimedia data when registration of a reproduction characteristic is designated and reading the conversion information from the storing means when reproduction in accordance with the registered reproduction characteristic is designated.

3. The data reproducing apparatus as set forth in claim 1, further comprising:
   storing means for storing data; and
   controlling means for storing the multimedia data that has been converted in accordance with the conversion information to the storing means when registration of reproduced data is designated and reading the data from the storing means when reproduction of the registered reproduced data is designated.

4. The data reproducing apparatus as set forth in claim 1, wherein the multimedia data is audio data, and
   wherein the data varying means is configured to vary the audio data whenever the multimedia data is read from the recording medium or once every a plurality of times the multimedia data is read therefrom.

5. The data reproducing apparatus as set forth in claim 4, wherein the data varying means is configured to vary the multimedia data in at least one of manners that a predetermined frequency band is emphasized or suppressed, an audio volume is varied, the number of quantizer bits is varied, a sampling frequency is varied, a bit rate is varied, a high frequency band is added, a noise is added, and an echo is added.

6. The data reproducing apparatus as set forth in claim 1, wherein the data is video data, and
   wherein the data varying means is configured to vary the video data whenever the data is read from the recording medium or once every a plurality of times it is read therefrom.

7. The data reproducing apparatus as set forth in claim 6, wherein the data varying means is configured to vary the data in at least one of manners that a color tone is varied, a luminance is varied, a contrast is varied, an edge is emphasized, a predetermined frequency band is emphasized or suppressed, a frame frequency is varied, a bit rate is varied, and a noise is added.

8. A data recording and reproducing apparatus, comprising:
   recording and reproducing means for writing multimedia data to a recording medium and reading multimedia data from the recording medium;
   conversion information generating means for generating conversion information that
   varies whenever the multimedia data is read from the recording medium or once every a plurality of times the multimedia data is read therefrom; and
   data converting means for converting the multimedia data that is read from the recording medium by the recording and reproducing means in accordance with the conversion information supplied from the conversion information generating means,
   wherein when registration of a reproduction characteristic is designated, the recording and reproducing means is configured to record the conversion information to the recording medium.

9. The data recording and reproducing apparatus as set forth in claim 8, further comprising:
   storing means for storing data; and
   controlling means for storing to the storing means the conversion information used to convert the multimedia data when registration of a reproduction characteristic is designated and reading the conversion information from the storing means when reproduction in accordance with the registered reproduction characteristic is designated.

10. The data recording and reproducing apparatus as set forth in claim 8, further comprising:
    storing means for storing data; and
    controlling means for storing the multimedia data that has been converted in accordance with the conversion information to the storing means when registration of reproduced multimedia data is designated and reading the multimedia data from the storing means when reproduction of the registered reproduced multimedia data is designated.

11. The data recording and reproducing apparatus as set forth in claim 8,
wherein the multimedia data is audio data, and
wherein a data varying means is configured to vary the audio data whenever the multimedia data is read from the recording medium or once every a plurality of times the multimedia data is read therefrom.

12. The data recording and reproducing apparatus as set forth in claim 11,
wherein the data varying means is configured to vary the multimedia data in at least one of manners that a predetermined frequency band is emphasized or suppressed, an audio volume is varied, the number of quantizer bits is varied, a sampling frequency is varied, a bit rate is varied, a high frequency band is added, a noise is added, and an echo is added.

13. The data recording and reproducing apparatus as set forth in claim 8,
wherein the data is video data, and
wherein the data varying means is configured to vary the video data whenever the data is read from the recording medium or once every a plurality of times it is read therefrom.

14. The data recording and reproducing apparatus as set forth in claim 13,
wherein the data varying means is configured to vary the data in at least one of manners that a color tone is varied, a luminance is varied, a contrast is varied, an edge is emphasized, a predetermined frequency band is emphasized or suppressed, a frame frequency is varied, a bit rate is varied, and a noise is added.

15. A data recording and reproducing method, comprising:
generating conversion information that varies whenever multimedia data is read from a recording medium or once every a plurality of times the multimedia data is read therefrom;
converting the multimedia data that is read from the recording medium in accordance with the conversion information generated by the conversion information generating;
recording the conversion information to the recording medium when registration of a reproduction characteristic is designated; and
converting the multimedia data that is read from the recording medium in accordance with the conversion information that is read from the recording medium when the reproduction in accordance with the registered reproduction characteristic is designated,
wherein the conversion information is environmental information, the environmental information including at least one of a temperature, humidity, atmospheric pressure, brightness, wind rate, or wind direction.

16. A data reproducing apparatus, comprising:
reproducing unit configured to read multimedia data from a recording medium; and
data varying unit configured to vary the multimedia data that is read from the recording medium whenever the multimedia data is read therefrom or once every a plurality of times the multimedia data is read therefrom, based on environmental information, the environmental information including at least one of a temperature, humidity, atmospheric pressure, brightness, wind rate, or wind direction,
wherein the data varying unit comprises:
conversion information generating means for generating conversion information that varies whenever the multimedia data is read from the recording medium or once every a plurality of times the multimedia data is read therefrom; and
data converting means for converting the multimedia data that is read from the recording medium by the reproducing means in accordance with the conversion information supplied from the conversion information generating means.

* * * * *